United States Patent [19]

Grasso et al.

[11] Patent Number: 5,355,250
[45] Date of Patent: Oct. 11, 1994

[54] FIBER OPTICAL COMMUNICATION LINE WITH SHUT OFF CONTROL

[75] Inventors: Giorgio Grasso, Monza; Aldo Righetti, Milan; Mario Tamburello, Vimercate, all of Italy

[73] Assignee: Pirelli Cavi S.p.A., Milan, Italy

[21] Appl. No.: 84,770

[22] Filed: Jun. 29, 1993

Related U.S. Application Data

[63] Continuation of Ser. No. 844,115, Mar. 2, 1992, abandoned.

[30] Foreign Application Priority Data

Mar. 29, 1991 [IT] Italy ............ MI91 A 000863

[51] Int. Cl.$^5$ ............ H01S 3/10; H04B 9/00; H01J 5/16
[52] U.S. Cl. ............ 359/341; 359/337; 359/177; 250/227.15
[58] Field of Search ............ 359/134, 155, 160, 194, 359/337, 177, 341; 356/73.1

[56] References Cited

U.S. PATENT DOCUMENTS

| | | | |
|---|---|---|---|
| 4,247,956 | 1/1981 | Christiansen et al. | |
| 4,313,224 | 1/1982 | Wakabayashi et al. | 359/160 |
| 4,435,849 | 3/1984 | Ilgner et al. | 359/177 |
| 4,696,060 | 9/1987 | Oswald | 359/377 |
| 4,882,774 | 11/1989 | Grotzinger | |
| 4,887,309 | 12/1989 | Andersson et al. | 359/177 |
| 4,954,786 | 9/1990 | Yamahawa et al. | 359/339 |
| 5,003,268 | 3/1991 | Tsuchiya | 359/339 |
| 5,054,876 | 10/1991 | Grasso et al. | 385/24 |
| 5,113,459 | 5/1992 | Grasso et al. | 385/24 |

FOREIGN PATENT DOCUMENTS

| | | | |
|---|---|---|---|
| 0331304 | 12/1989 | European Pat. Off. | H04B 9/00 |
| 3201763 | 9/1983 | Fed. Rep. of Germany | H04B 9/00 |
| 2051355 | 1/1981 | United Kingdom | H04B 9/00 |

OTHER PUBLICATIONS

Patent Abstracts of Japan vol. 10, No. 82 (E-392) (2139) Apr. 2, 1986 and JP-A-60 229 433 (Nippon Denki-abstract).

*Primary Examiner*—Nelson Moskowitz
*Attorney, Agent, or Firm*—Brooks Haidt Haffner & Delahunty

[57] ABSTRACT

The telecommunication line comprises at least one terminal station having an optical-signal transmitter and an optical-signal receiver, which are operationally connected by an automatic protection device suitable for shutting down said transmitter in the absence of a received optical signal, at least one opticalfibre line for the transmission of the optical signals transmitted by said transmitter and received by said receiver, and at least one optical amplifier included in said line. With said optical amplifier there are associated means for the detection of the presence of light energy at input and means for causing the shut down of the amplifier, which in the absence of light energy at input are caused by said detection means to interrupt substantially any emission of light energy on the part of said optical amplifier.

11 Claims, 1 Drawing Sheet

FIBER OPTICAL COMMUNICATION LINE WITH SHUT OFF CONTROL

This application is a continuation of application Ser. No. 07/844,115, filed Mar. 2, 1992 now abandoned.

DESCRIPTION

This application is related to application Ser. No. 07/846,276 filed Mar. 2, 1992 and filed by the inventors named in this application.

The present invention relates to an optical-fibre telecommunication line with optical amplifiers, provided with protection means in a position of interrupting the light emission along the entire line in the presence of an interruption of the optical fibre and of reactivating it automatically when its continuity is restored.

Telecommunication lines are known which use optical fibres to connect two terminal stations, each provided with a transmitter and a receiver suitable for allowing two-directional communication.

In particular each station comprises a transmitter, which sends a light signal along an optical-fibre line destined for the opposite station, and a receiver suitable for detecting the optical signal arriving from the other station and to send it on to a user.

In the case wherein the terminal stations are at a great distance from one another several amplification units may be interposed along the line which raise the power of the signal, so as to compensate for the attenuation to which the signal itself is subjected along the path.

Such amplification units may be constituted by so-called repeaters, which convert the signal from optical to electrical, amplify it in the electrical form and reconvert it to a highpower optical signal to reintroduce it again into the line, or they may be optical amplifiers, which receive the signal in the optical form and produce its amplification while maintaining its optical form.

An example of such optical amplifiers is constituted by the fibre-type optical amplifiers, wherein a so-called "active" fibre, containing a fluorescent substance, receives the optical signal to be amplified and pumping light energy at a different wavelength, which determines a stimulated emission on the part of the fluorescent substance coherent with the optical signal to be transmitted, which is thus amplified.

Amplifiers of the abovementioned type are, for example, described in the European patent application No. 90202736.6 dated 15 Oct. 1990 and published May 2, 1991 and corresponds to U.S. Pat. No. 5,119,229.

A problem inherent in optical-fibre telecommunication lines relates to the protection of staff who repair or maintain the line.

In the case of an intervention on a line fibre, say, in the presence of a breakage thereof, it is necessary to avoid the presence of light emission in the fibre, because such emission could accidentally be directed toward the eyes of the maintenance staff, with consequent offence for their eyes.

In this respect the known art, as described, for example, in the ISPT standards [Upper Institute of Posts and Telecommunications], technical specifications No. 919, January 1989 edition, pages 135–144, lays down that in the case of the non-reception of the signal on the part of an exchange unit or of a line unit in one direction of transmission the transmitter operating in the opposite direction must be shut down. This in turn, determines the shutting down of the transmitter in the station upstream, eliminating the presence of light emissions in the interrupted line.

A unit operating in the manner described above is illustrated in the publication "SIEMENS TELECOMUNICAZIONI, Doc. 612-802/56-TM/I, edition 1, Oct. 1989".

The object of the present invention is to accomplish an optical-fibre telecommunication line with optical amplifiers, which involve protection means in a position of interrupting the light emission along the entire line in the presence of an interruption of the optical fibre and of re-activating it automatically when its continuity is restored.

According to the invention such object is attained with an optical-fibre telecommunication line comprising at least one optical amplifier, characterized in that with said optical amplifier there are associated means for the detection of the presence of light energy at input and control means for shutting down the amplifier, which in the absence of light energy at input are operated by said detection means to substantially interrupt any emission of light energy on the part of said optical amplifier.

In this way, every time an interruption of the optical fibre takes place upstream from the optical amplifier, the consequent absence of light energy at the input to the same determines, through the abovementioned detection means and associated control means, the shutting down of the amplifier, which thus ceases to operate and above all to emit light energy at output. The optical amplifier is, on the other hand, automatically switched on again as soon as the light energy at input returns above the threshold level of said detection means.

According to a possible embodiment of the present invention the optical amplifier comprises a fluorescent element and a laser pump for supplying energy to said fluorescent element and the above-mentioned control means are associated with said laser pump so as to cause their shutting down in the case of the absence of light energy at input detected by said detection means.

There is thus also avoided a possible emission of "noise" due to the pumping effect, which could be taken for the presence of optical signal transmitted by the amplifiers and receiver located downstream.

Again according to a possible embodiment of the present invention the telecommunication line is of the type comprising two terminal stations, each having an optical-signal transmitter and an optical-signal receiver operationally connected by an automatic protection device suitable for shutting down said transmitter in the absence of a received optical signal, and respective optical-fibre lines connecting the transmitter of one station to the receiver of the other station and including, each, at least one optical amplifier provided with the abovementioned means for the detection and means for controlling shut down.

Due to the effect of this conformation of the telecomunication line the shut down of the optical amplifier downstream from the point at which the fibre is interrupted also determines the intervention of the device for the protection of the receiving station, which automatically shuts down the corresponding transmitter with the consequent absence of the optical signal on the line returning to the other station. This is where the corresponding protection device is triggered, which shuts down the corresponding transmitter, thus completing the disactivation of the entire telecommunication line.

Once the continuity of the line has been restored, on the other hand, the simple reactivation of the transmitter of the starting station determines the automatic restart of all the optical amplifiers previously shut down and, with the reception of the transmitted optical signal, the re-activation of the transmitter of the arrival station for the complete restoration of the line's functionality.

According to a further embodiment the telecommunication line has, on the other hand, a single terminal station including an optical-signal transmitter and an optical-signal receiver connected together through an optical-fibre line comprising at least one optical amplifier provided with the abovementioned means for the detection and means for controlling shut down, said transmitter end said receiver being also operationally connected by an automatic protection device suitable for shutting down said transmitter in the absence of a received optical signal.

The manner of operation of this latter embodiment, in particular as regards the automatic shut down in the case of an interruption along the line and the subsequent reactivation after repairs have been carried out, is evidently identical with that described above.

These and other features of the present invention shall be made evident by the following detailed description of an embodiment illustrated purely as a non-limiting example in the enclosed drawings, wherein.

Figure 1:
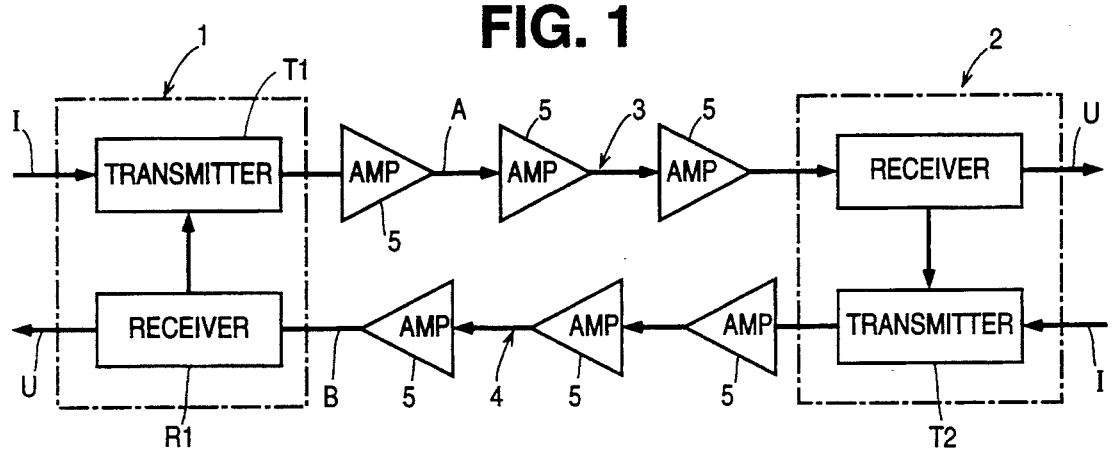
FIG. 1 shows the overall diagram of an optical-fibre telecommunication line.

With reference to FIG. 1, a classical optical-fibre telecommunication line comprises two terminal stations 1 and 2, each of which comprises a transmitter and a receiver, T1, R1 and T2, R2, respectively. The transmitter T1 of the station 1 is connected to the receiver R2 of the station 2 through a first optical-fibre line 3 and the transmitter T2 of the station 2 is connected to the receiver R1 of the station 1 through a second optical-fibre line 4. Alone each line 3 and 4 there is a series of optical amplifiers 5.

Figure 2:
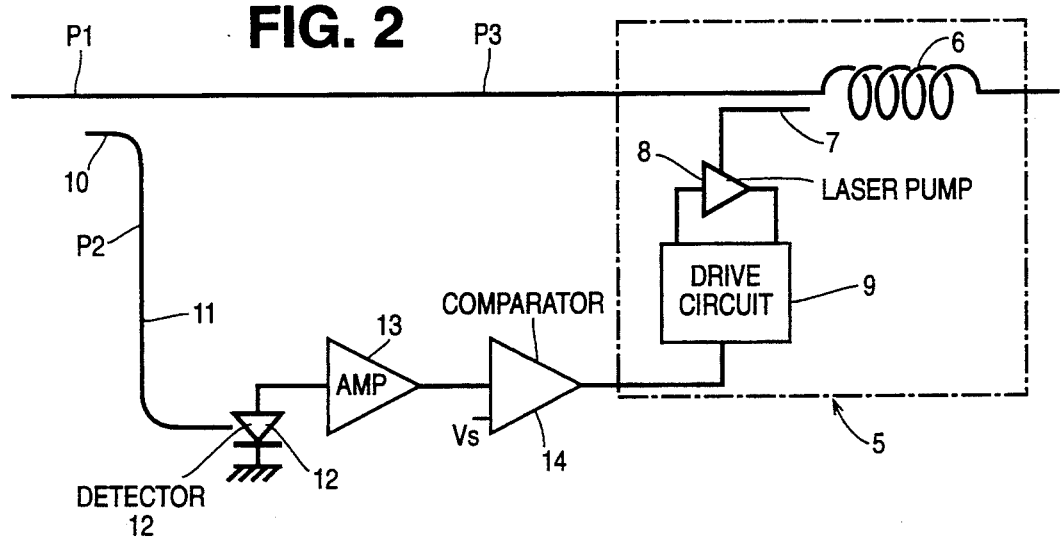
FIG. 2 shows the principle diagram of a fibre-type optical amplifier for the abovementioned line with associated a protection device according to the present invention.

According to the present invention the abovementioned amplifiers 5 are of the type illustrated in FIG. 2, that is, they are formed in a way known in itself by an active fibre 6 containing a fluorescent substance, by a dichroic coupler 7 and by a laser pump 8 with a corresponding driving circuit 9. The details of this type of known optical amplifier can be obtained by the already mentioned European patent application No. 90202736.6 dated 15 Oct. 1990.

With the abovementioned fibre-type optical amplifier there is associated, according to the invention, a protection device formed by a coupler 10 with an optical-fibre branch 11, by a photodiode-type optical detector 12, by an amplifier 13 and by a comparator 14 with reference threshold Vs, which is in a position of operating, through the driving circuit 9, the shut down of the laser pump 8 every time the photodiode 12 detects a light energy at input that is lower than that corresponding to the threshold Vs.

Considering an input power P1 normally ranging from 10 mW and 1 mW (that is, from −20 dBm and −30 dBm) and an intervention threshold of the protection unit equal to 1 mW, a possible choice of the different components of the protection device can involve the use of a directional coupler 10 of a standard commercial type with a ratio of 1:10 between the extracted power P2 and that in transit P3 and a useful power loss P3/P1 around 0.5 dB, of a photodiode 12 of the standard In Ga As type, sensitive at a wave length of both 1300 nm and 1500 nm, with a typical response around 0.8 A/W and current values corresponding to a intervention threshold equal to about 0.08 mA, of an amplifier 13 of the standard type capable of converting the current signal of the photodiode 12 into a voltage signal having an amplitude equal to 1–2 volts, and lastly of a comparator 14 also of the standard type.

Figure 3:
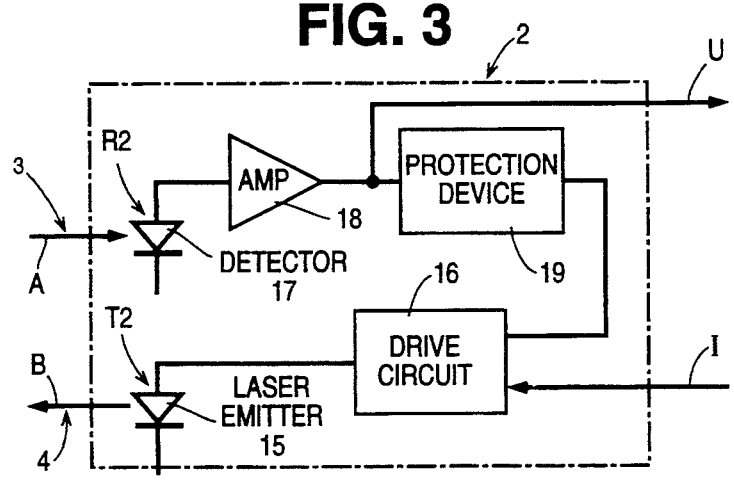
FIG. 3 shows the principle diagram of a terminal station for the telecommunication line of FIG. 1.

As illustrated in FIG. 3, which, as an example illustrates the station 2, each terminal station 1 and 2 comprises, in addition to the already mentioned transmitter and receiver, constituted essentially by a laser emitter 15 with driving circuit 16 and by a photodiode 17 with amplifer 18, a protection device 19, known in itself, constituted by a detector of the presence of a signal which operates on the driving circuit 16 so as to activate or shut down the laser emitter 15 according to the amplitude of the received signal.

Due to the effect of the described structure, the opticalfibre telecommunication line illustrated in the drawings operates as follows.

Let us suppose that an optical signal A corresponding to an electrical signal at input I is transmitted by the transmitter T1 of the terminal station 1 along the opticalfibre line 3. Suitably amplified by the optical amplifiers 5, the transmitted signal arrives at the terminal station 2, where it is received by the receiver R2 and converted into an output electrical signal U. Operating according to the known art, if the signal received by the terminal station exceeds a given threshold indicative of correct operation (say, 0.1 mW), the detector 17 feels the "presence" of the signal and keeps the transmitter T2 active. This transmitter T2 is thus available to emit an optical signal B on the optical-fibre line 4. Such a signal, in turn amplified by the optical amplifiers 5 of the line 4, is received by the receiver R1 of the station 1. The reception of signals transmitted by T2 on the part of R1 indicates that also the signals transmitted by T1 have been received by R2 and thus keeps the transmitter T1 in operation. Under this condition only a very small part of the power P1 received by each optical amplifier 5, substantially 0.5 dB in the abovementioned design hypothesis, is lost as a consequence of the presence of devices for the protection of the individual amplifiers that are illustrated in FIG. 2.

In the case that a breakage of an optical fibre or other type of intervention on the lines 3 and 4 causes an interruption or, at the very least, a drastic reduction of the power of the transmitted optical signal, the protection devices associated with the individual optical amplifiers 5 and with the terminal stations 1 and 2 intervene immediately to place the telecommunication line in a condition of safety for the staff who carry out repairs or maintenance.

More accurately, if the breakage or such like takes place upstream from an optical amplifier 5, the latter receives a signal power P1 that is nil or in any case reduced to such a level that the photodiode detector 12 of the protection device of FIG. 2 produces a signal having an amplitude below the threshold Vs of the comparator 14, which through the driving circuit 9 thus operates the shut down of the laser pump 8 with the consequent cancellation or very strong limitation of the optical amplifier's output power, available downstream from the active fibre 6. In the same way all the other optical amplifiers downstream from the breakage point 5 are shut down.

At the receiver located at the end of the interrupted line, say at R2 if the breakage has occurred along the line 3, there consequently arrives a signal that is nil or extremely low, which is recognized as such by the detector 19, which through the driving circuit 16 determines the shut down of the transmitter T2 and the consequent non-emission of optical signals on the return line.

All the optical amplifiers of the return line 4 are then shut down in cascade and the receiver R1 of the station 1 in turns shuts down the transmitter T1 with the consequent nonemission of the optical signal 4 and with the just as consequent shut down of all the optical amplifiers upstream from the breakage point.

The intervention mechanism in the case where the breakage occurs at a point of the line 3 or 4 immediately upstream from a receiver R2 or R1 is not different. Simply, the transmitter associated with the receiver in question is shut down first, then all the amplifiers of the line supplied by that transmitter, then also the transmitter of the other station and lastly all the amplifiers of the other line.

It is important to note that in this way the entire telecommunication line is disactivated and all the optical amplifiers are in a condition such as to substantially emit no output power, not even in the form of pumping noise which could erroneously be taken for a transmitted optical signal.

Once the continuity of the line has been restored, on the other hand, the re-activation or the transmitter of the transmitting station is sufficient to cause all the other optical amplifiers of the outgoing line to automatically switch on again, that evidently detect an input power that has returned to a normal level and, through the detector 12 and the comparator 14, operate the re-activation of the laser pump 8, and, as a consequence of the new reception of the signal on the part of the receiver of the receiving station, which switches back on the corresponding transmitter and, with the new emission of the return signal, determines that of the optical amplifiers along the return line.

The operation of the line according to the invention is appreciably different from that of a line provided with protection according to the known art; in fact, the known art involved that, when an amplification unit present in a line of the two-directional type, detected the absence of the signal at its input, say, in the direction 1-2 (from 1 toward 2), the shut down was operated of the amplification unit operating in the opposite 1-2 direction (from 2 toward 1). signalling upstream the presence of an anomaly.

In the amplification unit located further upstream (in the direction from 1 toward 2), the lack of a signal in the direction 2-1 in turn was to operate the shut down of the corresponding transmission in the direction 1-2, making the line section between the two units completely inactive.

Such a solution kept the other amplification units in a condition of uncertainty of operation, since they could disactivate the corresponding transmitter in the opposite direction, thus making a further line section inactive, or the presence of background noise, say, generated by the amplifiers themselves, could be interpreted as a signal and as such considered a signal of the correct operation of the line, keeping the amplifiers active.

In addition, when the line's functionality was restored, the traditional line required each transmitter to be reactivated, by acting directly on it or through an auxiliary line, thus making the system very complex.

The protection according to the known art required in any case that in each amplification unit there had to be a physical connection between the amplifier operating in one direction and the amplifier operating in the other direction.

According to the invention, on the contrary, it is not required that an optical amplifier located along the line be connected in any way to the opposite line; this is particularly convenient in the case where for any reason communications ere required to be accomplished in one direction along a path independent of that in the opposite direction, either in a permanent manner, thus accomplishing a connection between two terminal stations through two separate one-directional lines, or for a limited period, say, due to a temporary re-routing of communications in one direction along a line different from those in the other, due to anomalies, maintenance or such like.

In fact, in such cases it would not be possible to apply a protection device of the known type, or it would require checks or auxiliary lines, while the device according to the invention maintains its operational features also in such a line configuration.

Naturally the one illustrated in the drawings is only one possible embodiment of the telecommunication line according to the present invention. In particular, apart from obvious changes in circuit details, it can involve a telecommunication line comprising just one terminal station 1 provided with a transmitter T1 and with a receiver R1 connected together by a single optical-fibre line including a series of optical amplifiers (5) of the type illustrated in FIG. 2 and also operationally connected together by means of a protection device like the one illustrated in FIG. 3.

We claim:

1. In an optical fiber transmission system for transmitting optical signals from an optical signal transmitter to an optical signal receiver, said system comprising an optical fiber amplifier having an input and an output, a first optical fiber line for interconnecting said transmitter and said input and a second optical fiber line for interconnecting said output and said receiver, said optical fiber amplifier comprising an active optical fiber for amplifying optical signals received at said input without conversion of the optical signals to electrical signals and for normally supplying said optical signals in amplified form to said output and hence, to said second optical fiber line connected thereto, when the magnitude of the optical signals at said input of said amplifier exceeds a predetermined magnitude, said optical fiber amplifier further comprising a source of pumping light energy coupled to said active fiber for normally supplying pumping light energy to said active fiber and said optical fiber amplifier also normally supplying optical signals to said second optical fiber line when the optical signals received at said input are below said predetermined magnitude, the improvement comprising protection means for substantially interrupting the supply of optical signals to said second optical fiber line by said amplifier when the optical signals received at said input are below said predetermined magnitude and thereby preventing the presence of harmful optical radiation at said output and in said second optical fiber line, said protection means comprising:

detecting means for detecting optical signals transmitted by said transmitter coupled to one of said input and said first optical fiber line and responsive to optical signals supplied to said input; and control means connected to said amplifier and said detecting means and responsive to the magnitude of detected optical signals, said control means preventing the supply of optical signals to said second optical fiber line by said optical fiber amplifier as long as said detected optical signals have a magnitude less than said predetermined magnitude.

2. An optical fiber transmission system as set forth in claim 1 wherein said optical fiber amplifier comprises energizing means which renders said optical fiber amplifier alternately operative and inoperative and wherein said control means is connected to said energizing means for rendering said optical fiber amplifier inoperative when said detected optical signals have a magnitude less than said predetermined magnitude.

3. An optical fiber transmission system as set forth in claim 1 wherein said active optical fiber includes a fluorescent dopant and wherein said control means is connected to said source for controlling the light energy supplied by said source to said active fiber and preventing the supply of pumping light energy to said active fiber when said detected optical signals have a magnitude less than said predetermined magnitude.

4. An optical fiber transmission system as set forth in claim 3 wherein said control means controls the energization of said source and terminates energization of said source when said detected optical signals have a magnitude less than said predetermined magnitude.

5. An optical fiber transmission system as set forth in claim 1 wherein said optical signal receiver is part of a first terminal including a further optical signal transmitter and further comprising protection means connected to said receiver and to said further optical signal transmitter for preventing transmission of optical signals by said further optical signal transmitter when the magnitude of the optical signals received by said receiver is less than said predetermined magnitude.

6. In an optical fiber transmission system for transmitting optical signals from a first terminal to a second terminal and from said second terminal to said first terminal, each terminal comprising an optical signal transmitter and an optical signal receiver and each terminal having first protection means connected to the optical signal receiver and the optical signal transmitter thereat for preventing transmission of optical signals by the optical signal transmitter thereat when the magnitude of the optical signals received by the optical signal receiver thereat is less than a predetermined magnitude, said system comprising a plurality of optical fibers and a plurality of optical fiber amplifiers having an input and an output interconnecting said optical signal transmitter of said first terminal with said optical signal receiver of said second terminal and said optical signal transmitter of said second terminal with said optical signal receiver of said first terminal, each said optical fiber amplifier comprising an active optical fiber for amplifying optical signals received at said input without conversion of the optical signals to electrical signals and for normally supplying said optical signals in amplified form to said output and hence, to the optical fiber line connected thereto, when the magnitude of the optical signals at said input of said amplifier exceeds a predetermined magnitude, said optical fiber amplifier further comprising a source of pumping light energy coupled to said active fiber for normally supplying pumping light energy to said active fiber and said optical fiber amplifier also normally supplying optical signals to said second optical fiber line when the optical signals received at said input are below said predetermined magnitude, the improvement comprising second protection means for substantially interrupting the supply of optical signals to said second optical fiber line by said amplifier when the optical signals received at said input are below said predetermined magnitude and thereby preventing the presence of harmful optical radiation at said output and in said second optical fiber line, said protection means comprising:

detecting means at each said optical amplifier for detecting optical signals coupled to the input of the optical amplifier and responsive to optical signals supplied to the last-mentioned said input; and control means at each said optical amplifier and connected to the amplifier and the detecting means and responsive to detected optical signals, said control means preventing the supply of optical signals to the optical fiber connected to the output of the optical fiber amplifier when said detected optical signals have a magnitude less than said predetermined magnitude.

7. An optical fiber transmission system as set forth in claim 6 wherein each said optical fiber amplifier comprises energizing means which renders said optical fiber amplifier alternately operative and inoperative and wherein said control means is connected to said energizing means for rendering said optical fiber amplifier inoperative when said detected optical signals have a magnitude less than said predetermined magnitude.

8. An optical fiber transmission system as set forth in claim 6 wherein each said active optical fiber includes a fluorescent dopant and wherein said control means is connected to said source for controlling the light energy supplied by said source to said active fiber and preventing the supply of pumping light energy to said active fiber when said detected optical signals have a magnitude less than said predetermined magnitude.

9. An optical fiber transmission system as set forth in claim 8 wherein said control means controls the energization of said source and terminates energization of said source when said detected optical signals have a magnitude less than said predetermined magnitude.

10. An optical fiber amplifier having an input and an output and comprising an active optical fiber between said input and said output for amplifying optical signals received at said input without conversion of the optical signals to electrical signals and for normally supplying amplified optical signals to said output corresponding to optical signals received at said input and in amplified form, said optical fiber amplifier further comprising a source of pumping light energy coupled to said active optical fiber for normally supplying pumping light energy to said active fiber as first control means coupled to said active fiber for controlling the amplification caused by said active fiber, said optical fiber amplifier also normally supplying optical signals to said output when the optical signals received at said input are below a predetermined magnitude, detecting means for detecting optical signals coupled to said input and responsive to detected optical signals supplied to said input and second control means connected to said detecting means and to said first control means for preventing the supply of optical signals to said output as long as said detected optical signals have a magnitude less than said predetermined magnitude.

11. An optical fiber amplifier as set forth in claim 10 wherein said active optical fiber includes a fluorescent dopant and wherein said second control means is connected to said pumping light source for preventing the supply of pumping light energy to said active fiber when said detected light signals have a magnitude less than said predetermined magnitude.

* * * * *